(No Model.)

J. DAIN, Jr.
HORSE HAY RAKE.

No. 288,314. Patented Nov. 13, 1883.

WITNESSES
Chas. R. Burr
Geo. H. Harvey

Joseph Dain, Jr.
INVENTOR by C. A. Brown & Co.
Attorneys.

UNITED STATES PATENT OFFICE.

JOSEPH DAIN, JR., OF KANSAS CITY, MISSOURI.

HORSE HAY-RAKE.

SPECIFICATION forming part of Letters Patent No. 288,314, dated November 13, 1883.

Application filed April 12, 1883. (No model.)

*To all whom it may concern:*

Be it known that I, JOSEPH DAIN, Jr., a citizen of the United States, residing at Kansas City, in the county of Jackson and State of Missouri, have invented a new and useful Hay Rake or Gatherer, of which the following is a specification, reference being had to the accompanying drawings.

This invention relates to hay rakes or gatherers; and it consists in certain improvements in the construction of the same, which will be hereinafter fully described, and particularly pointed out in the claims.

Figure 1:
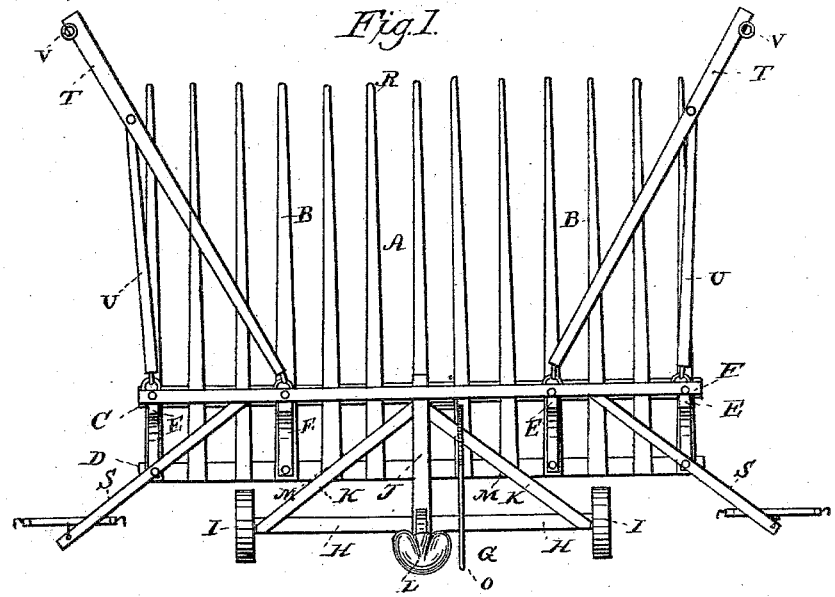
Figure 2:
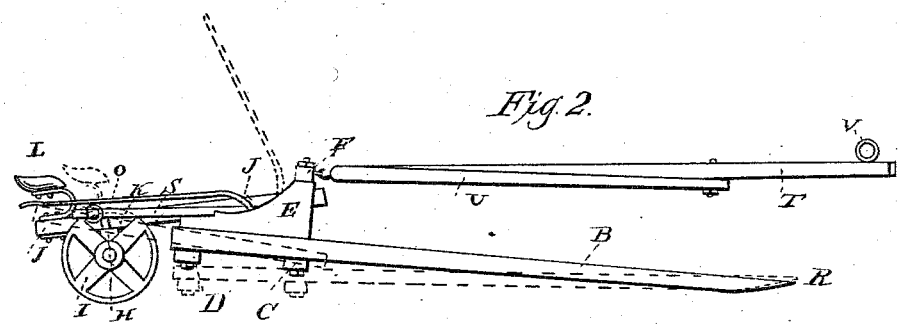
Figure 3:
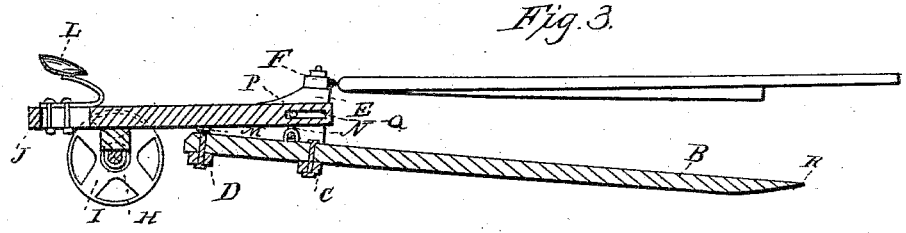

In the drawings hereto annexed, Figure 1 is a plan view, Fig. 2 is a side view, and Fig. 3 is a longitudinal vertical sectional view, of my improved hay rake or gatherer.

The same letters refer to the same parts in all the figures.

A in the drawings designates the body of my improved rake, which consists of teeth B B, connected by cross-bars C and D on their under sides, said cross-bars being placed, respectively, at and near the rear ends of the teeth, which are in this manner firmly connected. Several of the teeth are also provided with blocks E on their upper sides, at their rear ends, which said blocks are connected by cross bar or brace F. This general construction is not absolutely essential to the successful operation of my invention, and changes with respect to this may be made without departing from the spirit of my invention.

G is a truck, consisting, mainly, of an axle, H, mounted upon transporting-wheels I I, and having a short tongue, J, connected with the axle by diagonal braces K K. The tongue also forms the seat-bar, upon which the driver's seat L is mounted. The truck G is connected to the body of the rake by hinges M M, which connect the rear end of the rake with the under sides of the diagonal braces K.

N is a rock-shaft, which is journaled transversely upon the rake-head, and provided at one end with an operating handle or lever, O, convenient to the driver, and at the other end with a crank, P, working in a slot, Q, formed horizontally in the front end of the tongue. By this arrangement it will be seen that the rake may be manipulated so as to raise or lower its rear end, which is supported and held off the ground by the truck.

The front ends of the rake-teeth, which rest upon the ground, are beveled on their under sides, so that the points R shall, under all circumstances, be raised some distance above the ground. By raising or lowering the rear end of the rake the points will, at the same time, be raised or lowered, thus adapting the device to even or uneven ground, as the case may be.

To the upper side of the rear end of the rake-head, at both sides of the latter, are secured diagonally outward and rearward extending beams S S, to the outer ends of which the horses are hitched. T T are beams or bars hooked or hinged to the cross bar or brace F, at some distance from the ends of the latter. U U are braces pivotally connected to the beams T T, and hooked or otherwise connected to the ends of the cross-bar F, as shown. The outer ends of the beams T T are provided with loops V V, to receive the holdback-straps.

The operation of my improved rake will be readily understood. The draft is easy and readily controlled, and admits of the rake being backed from under its load with great facility.

I claim as my invention and desire to secure by Letters Patent of the United States—

1. In a rake of the class described, the forwardly and outwardly projecting hinged beams, forming tongues for the said rake, as set forth.

2. In a horse-rake of the class described, the forwardly and outwardly projecting hinged beams, forming tongues for the said rake, in combination with braces hinged to the said rake and connected pivotally to the tongues, as set forth.

3. In a horse-rake of the class described, the combination, with the transverse bar or brace, of the forwardly and outwardly extending hinged tongues and braces, and the rearwardly and outwardly extending hitching-beams, as set forth.

4. The combination of the rake, a rock-shaft mounted transversely upon the latter, and having an operating-lever and a crank, a truck having a short tongue provided with a slot at its front end to receive the crank of the rock-shaft, diagonal braces connecting the tongue with the axle of the truck, and hinges connecting the said diagonal braces with the rear end or head of the rake, as set forth.

In testimony that I claim the foregoing as my own I have hereto affixed my signature in presence of two witnesses.

JOSEPH DAIN, Jr.

Witnesses:
A. G. TRUMBULL,
O. S. RICHARDS.